(12) United States Patent
Shen

(10) Patent No.: US 11,716,676 B2
(45) Date of Patent: Aug. 1, 2023

(54) CHANNEL DETECTION METHOD AND DEVICE, AND COMPUTER STORAGE MEDIUM

(71) Applicant: GUANGDONG OPPO MOBILE TELECOMMUNICATIONS CORP., LTD., Guangdong (CN)

(72) Inventor: Jia Shen, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 20 days.

(21) Appl. No.: 16/968,589

(22) PCT Filed: Feb. 8, 2018

(86) PCT No.: PCT/CN2018/075852
§ 371 (c)(1),
(2) Date: Aug. 8, 2020

(87) PCT Pub. No.: WO2019/153201
PCT Pub. Date: Aug. 15, 2019

(65) Prior Publication Data
US 2021/0050937 A1 Feb. 18, 2021

(51) Int. Cl.
*H04W 48/16* (2009.01)
*H04L 5/00* (2006.01)
(Continued)

(52) U.S. Cl.
CPC ............ *H04W 48/16* (2013.01); *H04L 5/001* (2013.01); *H04L 5/0053* (2013.01);
(Continued)

(58) Field of Classification Search
CPC . H04W 48/16; H04W 72/042; H04W 72/044; H04W 72/0446; H04W 72/0453; H04L 5/0053; H04L 5/0094
See application file for complete search history.

(56) References Cited

U.S. PATENT DOCUMENTS

| 2018/0332505 A1* | 11/2018 | Kim | H04W 28/20 |
| 2019/0150073 A1* | 5/2019 | Tiirola | H04W 72/10 455/434 |

(Continued)

FOREIGN PATENT DOCUMENTS

| CN | 107257275 | 10/2017 | |
| KR | 10-2017-0076934 | * 6/2017 | H04L 5/0092 |

OTHER PUBLICATIONS

Translation of portion of KR 10-2017-0076934, 2017.*
(Continued)

*Primary Examiner* — Kevin C. Harper
(74) *Attorney, Agent, or Firm* — Hodgson Russ LLP

(57) ABSTRACT

Disclosed in the present application are a channel detection method and device, and a computer storage medium. The method comprises: when N downlink bandwidth parts (BWPs) corresponding to a terminal are in an activated state, wherein an nth BWP in the N BWPs is provided with Cn control resource sets and Sn search space sets, the terminal determining K BWPs and/or $$\sum_n C_n'$$

(Continued)

control resource sets and/or $$\sum_n Sn'$$

search space sets according to indication information or a preset rule of a network device, $N \geq 2$, $1 \leq n \leq N$, $0 \leq K \leq N$, $0 \leq Cn' \leq Cn$, $0 \leq Sn' \leq Sn$; and the terminal performing detection on a downlink control channel in the K BWPs and/or the $$\sum_n Cn'$$

control resource sets and/or the $$\sum_n Sn'$$

search space sets.

8 Claims, 7 Drawing Sheets

(51) Int. Cl.
  *H04W 72/044* (2023.01)
  *H04W 72/23* (2023.01)
  *H04L 1/00* (2006.01)

(52) U.S. Cl.
  CPC ......... *H04L 5/0094* (2013.01); *H04W 72/044* (2013.01); *H04W 72/23* (2023.01); *H04L 1/0038* (2013.01); *H04L 5/0098* (2013.01)

(56) References Cited

U.S. PATENT DOCUMENTS

| 2019/0215098 | A1* | 7/2019 | Tiirola | H04L 25/0238 |
| 2020/0119895 | A1* | 4/2020 | Choi | H04L 5/0007 |
| 2020/0196285 | A1* | 6/2020 | Zhuang | H04L 5/0089 |
| 2020/0221428 | A1* | 7/2020 | Moon | H04B 7/024 |

OTHER PUBLICATIONS

LG Electronics, "RMSI delivery and CORESET configuration," 3GPP TSG RAN WG1 Meeting #91, R1-1719894, Dec. 2017, 15 pages.

ZTE et al., "Search space design and related issues," 3GPP TSG RAN WG1 Meeting AH 1801, R1-1800130, Jan. 2018, 8 pages.

WIPO, ISR for PCT/CN2018/075852, Oct. 29, 2018.

EPO, Extended European Search Report for EP Application No. 18905750.8, dated Jan. 14, 2021.

Huawei et al., Scheduling and Resource Allocation Mechanism for Active Bandwidth Parts, 3GPP TSG RAN WG1 NR Ad Hoc Meeting, R1-1709974, Jun. 2017.

Intel, "Open Issues for Wider Bandwidth Operations," 3GPP TSG RAN WG1 NR Ad-Hoc #2, R1-1710583, Jun. 2017.

"3rd Generation Partnership Project; Technical Specification Group Radio Access Network; NR; Physical layer procedures for control (Release 15)," 3GPP TS 38.213, Dec. 2017, v15.0.0, 56 pages.

* cited by examiner

CHANNEL DETECTION METHOD AND DEVICE, AND COMPUTER STORAGE MEDIUM

CROSS-REFERENCE TO RELATED APPLICATION

This application is a U.S. national phase application of International Application No. PCT/CN2018/075852, filed Feb. 8, 2018, the entire disclosure of which is incorporated herein by reference.

TECHNICAL FIELD

The invention relates to the technical field of wireless communication, in particular, to a channel detection method and device, and a computer storage medium.

BACKGROUND

In a Long Term Evolution (LTE) system, frequency domain resources of a terminal are allocated in an entire system bandwidth. In a 5th Generation (5G) New Radio (NR) system, as the system bandwidth is greatly increased, a transmission bandwidth of a terminal may only occupy a part of a system bandwidth.

In current research of the 5G NR, it has been decided to introduce a concept of Band Width Part (BWP) to achieve frequency domain resource allocation in a smaller range than a system bandwidth. A base station may configure a plurality of BWPs through Radio Resource Control (RRC) signaling, and then dynamically activate a BWP in Downlink Control Information (DCI). Each BWP is based on a numerology, wherein the numerology includes subcarrier spacing and Cyclic Prefix (CP).

SUMMARY

Embodiments of the present invention provide a channel detection method and device, and a computer storage medium.

A channel detection method provided by an embodiment of the present invention includes:

when N downlink bandwidth parts (BWPs) corresponding to a terminal are in an activated state, wherein an nth BWP in the N BWPs is provided with Cn control resource sets and Sn search space sets, the terminal determining K BWPs and/or $$\sum_n Cn'$$

control resource sets and/or search $$\sum_n Sn'$$

space secs according indication information or a preset rule of a network device, N≥2, 1≤n≤N, 0≤K≤N, 0≤Cn'≤Cn, 0≤Sn'≤Sn;

the terminal performing detection on a downlink control channel in the K BWPs and/or the $$\sum_n Cn'$$

control resource set and/or the $$\sum_n Sn'$$

search space sets.

In an embodiment of the present invention, the preset rule includes at least one of the following:

K BWPs with a largest or smallest subcarrier spacing in the N BWPs;

K BWPs with a largest or smallest bandwidth in the N BWPs;

K BWP s with a largest or smallest frequency domain range of the control resource sets in the N BWPs;

all of the control resource sets in the N BWPs include $$\sum_n Cn'$$

control resource sets with most or least frequency domain resources;

all of the control resource sets of the N BWPs include $$\sum_n Cn'$$

control resource sets with a largest or smallest time domain length;

all of the search space sets of the N BWPs include $$\sum_n Sn'$$

search space sets with a largest or smallest time domain density.

In an embodiment of the present invention, the indication information of the network device includes at least one of the following:

indication information of a BWP, indication information of a control resource set, and indication information of a search space set.

In an embodiment of the present invention, the terminal performing detection on the downlink control channel in the K BWPs and/or the $$\sum_n Cn'$$

control resource sets and/or the $$\sum_n Sn'$$

search space sets, includes:

the terminal performing detection on the downlink control channel in a BWP determined based on the indication information of the BWP; and/or, the terminal performing detection on the downlink control channel in a control resource set determined based on the indication information of the control resource set; and/or, the terminal performing detection on the downlink control channel in a search space set determined based on the indication information of the search space set.

In an embodiment of the present invention, the indication information of the network device is DCI, or RRC signaling, or System Information (SI).

In an embodiment of the present invention, the method further includes:

the terminal determining resources scheduled by the downlink control channel in the K BWPs, wherein the resources scheduled by the downlink control channel include resources in the K BWPs, and/or resources in other BWPs in the N BWPs other than the K BWPs.

A channel detection method provided by an embodiment of the present invention includes:

a network device sending indication information to a terminal, so that the terminal performs detection on a downlink control channel in K BWPs and/or $$\sum_n Cn'$$

control resource sets and/or $$\sum_n Sn'$$

search space sets according to the indication information of the network device, wherein, N BWPs corresponding to the terminal is in an activated state, and an nth BWP in the N BWPs is provided with Cn control resource sets and Sn search space sets, N≥2, 1≤n≤N, 0≤K≤N, 0≤Cn'—≤Cn, 0≤Sn'≤Sn.

In an embodiment of the present invention, the method further includes:

the network device transmitting the downlink control channel in the K BWPs and/or the $$\sum_n Cn'$$

control resource sets and/or the $$\sum_n Sn'$$

search space sets according to a preset rule.

In an embodiment of the present invention, the preset rule includes at least one of the following:

K BWPs with a largest or smallest subcarrier spacing in the N BWPs;

K BWPs with a largest or smallest bandwidth in the N BWPs;

K BWPs with a largest or smallest frequency domain range of the control resource sets in the N BWPs;

all of the control resource sets in the N BWPs include $$\sum_n Cn'$$

control resource sets with most or least frequency domain resources;

all of the control resource sets of the N BWPs include $$\sum_n Cn'$$

control resource sets with a largest or smallest time domain length;

all of the search space sets of the N BWPs include $$\sum_n Sn'$$

search space sets with a largest or smallest time domain density.

In an embodiment of the present invention, the indication information of the network device includes at least one of the following:

indication information of a BWP, indication information of a control resource set, and indication information of a search space set.

In an embodiment of the present invention, the indication information of the network device is DCI, or RRC signaling, or System Information (SI).

In an embodiment of the present invention, resources scheduled by the downlink control channel include resources in the K BWPs, and/or resources in other BWPs in the N BWPs other than the K BWPs.

A channel detection device provided by an embodiment of the present invention includes:

a first determination unit, configured to: when N downlink bandwidth parts (BWPs) corresponding to a terminal are in an activated state, wherein an nth BWP in the N BWPs is provided with Cn control resource sets and Sn search space sets, determine K BWPs and/or $$\sum_n Cn'$$

control resource sets and/or $$\sum_n Sn'$$

search space sets according to indication information or a preset rule of a network device, N≥2, 1≤n≤N, 0≤K≤N, 0≤Cn'≤Cn, 0≤Sn'≤Sn;

a detection unit, configured to: perform detection on a downlink control channel in the K BWPs and/or $$\sum_n Cn'$$

the control resource sets and/or the $$\sum_n Sn'$$

search space sets.

In an embodiment of the present invention, the preset rule includes at least one of the following:

K BWPs with a largest or smallest subcarrier spacing in the N BWPs;

K BWPs with a largest or smallest bandwidth in the N BWPs;

K BWPs with a largest or smallest frequency domain range of the control resource sets in the N BWPs;

all of the control resource sets in the NBWPs include $$\sum_n Cn'$$

control resource sets with most or least frequency domain resources;

all of the control resource sets of the NBWPs include $$\sum_n Cn'$$

control resource sets with a largest or smallest time domain length;

all of the search space sets of the N BWPs include $$\sum_n Sn'$$

search space sets with a largest or smallest time domain density.

In an embodiment of the present invention, the indication information of the network device includes at least one of the following:

indication information of a BWP, indication information of a control resource set, and indication information of a search space set.

In an embodiment of the present invention, the detection unit is configured to: perform detection on the downlink control channel in a BWP determined based on the indication information of the BWP; and/or, perform detection on the downlink control channel in a control resource set determined based on the indication information of the control resource set; and/or, the terminal perform detection on the downlink control channel in a search space set determined based on the indication information of the search space set.

In an embodiment of the present invention, the indication information of the network device is DCI, or RRC signaling, or System Information (SI).

In an embodiment of the present invention, the device further includes:

a second determination unit, configure to: determine resources scheduled by the downlink control channel in the K BWPs, wherein the resources scheduled by the downlink control channel include resources in the K BWPs, and/or resources in other BWPs in the N BWPs other than the K BWPs.

A channel detection device provided by an embodiment of the present invention includes:

a sending unit, configured to: send indication information to a terminal, so that the terminal performs detection on a downlink control channel in K BWPs and/or $$\sum_n Cn'$$

control resource sets and/or $$\sum_n Sn'$$

search space sets according to the indication information of the network device, wherein, N BWPs corresponding to the terminal is in an activated state, and an nth BWP in the N BWPs is provided with Cn control resource sets and Sn search space sets, N≥2, 1≤n≤N, 0≤K≤N, 0≤Cn'≤Cn, 0≤Sn'≤Sn.

In an embodiment of the present invention, the device further includes:

a transmission unit, configured to: transmit the downlink control channel in the K BWPs and/or $$\sum_n Cn'$$

control resource sets and/or $$\sum_n Sn'$$

search space sets according to a preset rule.

In an embodiment of the present invention, the preset rule includes at least one of the following:

K BWPs with a largest or smallest subcarrier spacing in the N BWPs;

K BWPs with a largest or smallest bandwidth in the N BWPs;

K BWPs with a largest or smallest frequency domain range of the control resource sets in the N BWPs;

all of the control resource sets in the N BWPs include $$\sum_n Cn'$$

control resource sets with most or least frequency domain resources;

all of the control resource sets of the N BWPs include $$\sum_n Cn'$$

control resource sets with a largest or smallest time domain length;

all of the search space sets of the N BWPs include $$\sum_n Sn'$$

search space sets with a largest or smallest time domain density.

In an embodiment of the present invention, the indication information of the network device includes at least one of the following:

indication information of a BWP, indication information of a control resource set, and indication information of a search space set.

In an embodiment of the present invention, the indication information of the network device is DCI, or RRC signaling, or System Information (SI).

In an embodiment of the present invention, resources scheduled by the downlink control channel include resources in the K BWPs, and/or resources in other BWPs in the N BWPs other than the K BWPs.

A computer storage medium provided by an embodiment of the present invention has computer executable instructions stored thereon, and when the computer executable instructions are executed by the processor, the above channel detection method is implemented.

BRIEF DESCRIPTION OF THE DRAWINGS

The drawings described herein are used to provide a further understanding of the present invention and form a part of the present application. The schematic embodiments of the present invention and their descriptions are used to explain the present invention and do not constitute an undue limitation on the present invention. In the drawings.

DETAILED DESCRIPTION

In order to understand the features and technical contents of the embodiments of the present invention in more detail, the following describes the implementation of the embodiments of the present invention in detail with reference to the drawings. The accompanying drawings are for reference only and are not intended to limit the embodiments of the present invention.

Figure 1:
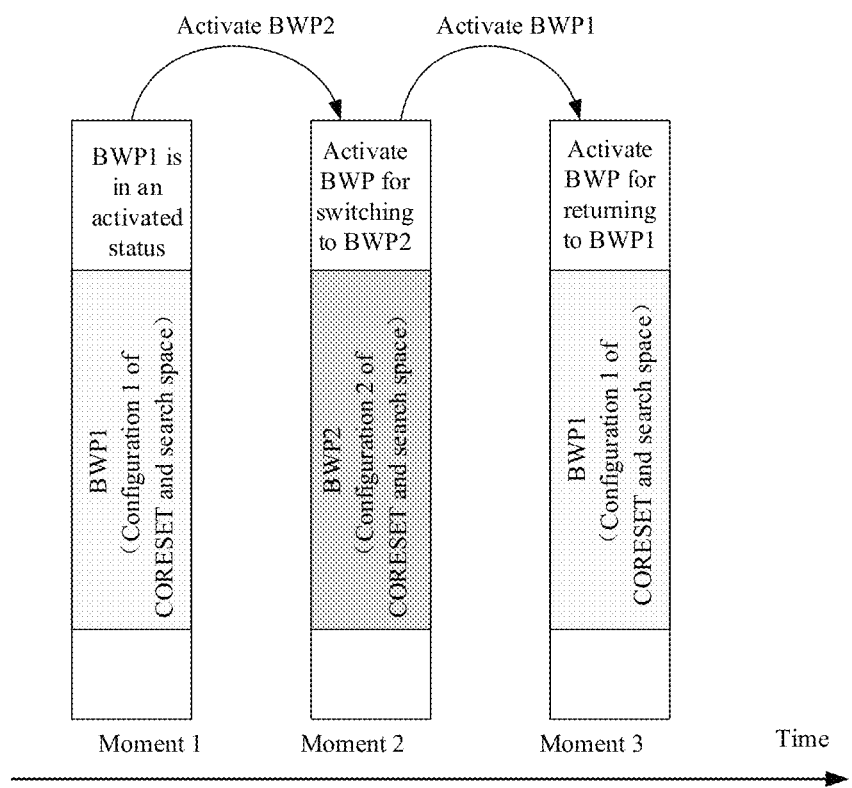
FIG. 1 is a schematic diagram of only one BWP capable of an activated state.
Figure 2:
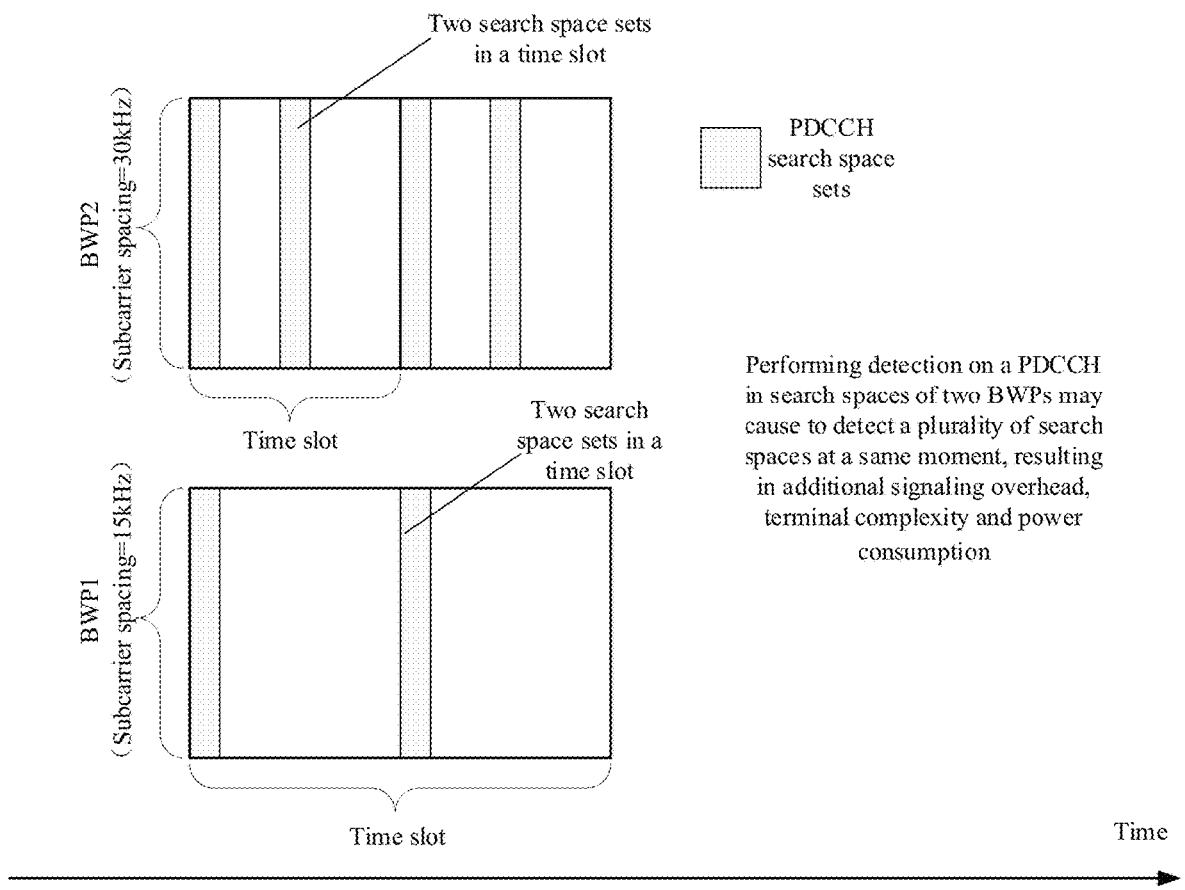
FIG. 2 is a schematic diagram of performing detection on a PDCCH in all search spaces in the case of a plurality of BWPs.

FIG. 1 is a schematic diagram of only one BWP capable of an activated state, and FIG. 2 is a schematic diagram of performing detection on a PDCCH in all search spaces in the case of a plurality of BWPs. As shown in FIG. 1, when BWP1 is in an activated state, if BWP2 is activated, the BWP1 will be deactivated, and if the BWP1 is activated again, the BWP2 will be deactivated. Each BWP is provided with a Control Resource Set (CORESET) and a Search Space (SS) of a Physical Downlink Control Channel (PDCCH), and when a certain BWP is activated, a terminal performs blind detection on the PDCCH according to a configuration of CORESET/SS corresponding to this BWP.

Existing technical solutions cannot support simultaneous activation of a plurality of BWPs, and therefore cannot support simultaneous use of a plurality of numerologies, nor can they optimize their numerologies for different services when a plurality of types of services are transmitted in parallel. And switching between the two numerologies will cause switching between the two BWPs, causing the terminal's RF bandwidth to be converted, and the conversion of the RF bandwidth will cause the terminal to be unable to receive or send data for a period of time, resulting in a waste of spectrum resources.

However, if the plurality of BWPs are activated simultaneously, it will cause the terminal to simultaneously detect the PDCCH on the plurality of BWPs, resulting in a waste of signaling overhead and an increase in terminal complexity and power consumption. As shown in FIG. 2, a subcarrier spacing of the BWP1=15 kHz, and a subcarrier spacing of the BWP2=30 kHz. In the BWP1 and BWP2, there are two search space sets in each time slot. It can be seen that the search space set in the BWP1 and the search space in the BWP2 partially overlap in a time domain, so that at certain moments, the terminal has to simultaneously detect the PDCCH on both BWPs, resulting in additional control signaling and higher terminal complexity and power consumption.

Figure 3:
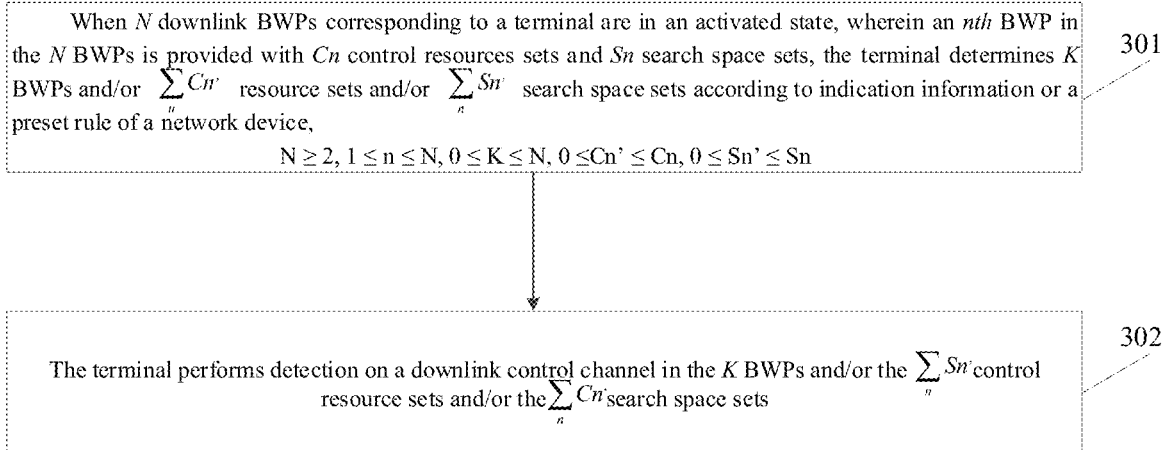
FIG. 3 is a schematic flowchart 1 of a channel detection method according to an embodiment of the present invention.

FIG. 3 is a schematic flowchart 1 of a channel detection method according to an embodiment of the present invention. As shown in FIG. 3, the channel detection method includes the following steps:

Step 301, When N downlink BWPs corresponding to a terminal are in an activated state, wherein an nth BWP in the N BWPs is provided with Cn control resources sets and Sn search space sets, the terminal determines K BWPs and/or $$\sum_n Cn'$$

control resource sets and/or $$\sum_n Sn'$$

search space sets according to indication information or a preset rule of a network device, N≥2, 1≤n≤N, 0≤K≤N, 0≤Cn'≤Cn, 0≤Sn'≤Sn.

In an embodiment of the present invention, the terminal may be any device that may communicate with a network, such as a mobile phone, a tablet computer, a notebook computer, or a desktop computer.

In an embodiment of the present invention, the network device may be a base station, such as a gNB of a 5G system.

In an embodiment of the present invention, the N downlink BWPs corresponding to the terminal are in the activated state, and N≥2, for example: BWP1, BWP2, BWP3, and BWP4 are in the activated state, wherein the BWP1 is provided with C1 control resource sets and S1 search space sets. It should be understood that one BWP may include a plurality of control resource sets, and one control resource set may include a plurality of search space sets. Similarly, the BWP2 is provided with C2 control resource sets and S2 search space sets, the BWP3 is provided with C3 control resource sets and S3 search space sets, and the BWP4 is provided with C4 control resource sets and S4 search space sets.

In an embodiment, the terminal determines the K BWPs and/or the $$\sum_n Cn'$$

control resource sets and/or the $$\sum_n Sn'$$

search space sets according to the preset rule, wherein, the preset rule includes at least one of the following:

K BWPs with a largest or smallest subcarrier spacing in the N BWPs;

K BWPs with a largest or smallest bandwidth in the N BWPs;

K BWPs with a largest or smallest frequency domain range of the control resource sets in the N BWPs;

all of the control resource sets in the NBWPs include $$\sum_n Cn'$$

control resource sets with most or least frequency domain resources;

all of the control resource sets of the NBWPs include $$\sum_n Cn'$$

control resource sets with a largest or smallest time domain length;

all of the search space sets of the N BWPs include $$\sum_n Sn'$$

search space sets with a largest or smallest time domain density.

In another embodiment, the terminal determines the K BWPs and/or the $$\sum_n Cn'$$

control resource sets and/or the $$\sum_n Sn'$$

search space sets according to the indication information of the network device, wherein, the indication information of the network device includes at least one of the following:

indication information of a BWP, indication information of a control resource set, and indication information of a search space set.

Based on this, the terminal performs detection on the downlink control channel in a BWP determined based on the indication information of the BWP; and/or, the terminal performs detection on the downlink control channel in a control resource set determined based on the indication information of the control resource set; and/or, the terminal performs detection on the downlink control channel in a search space set determined based on the indication information of the search space set.

In an embodiment, the indication information of the network device is DCI, or RRC signaling, or System Information (SI).

Step 302, the terminal performs detection on a downlink control channel in the K BWPs and/or the $$\sum_n Cn'$$

control resource sets and/or the $$\sum_n Sn'$$

search space sets.

Assuming: BWP1, BWP2, BWP3, and BWP4 corresponding to the terminal are in the activated state, wherein the BWP1 is provided with C1 control resource sets and S1 search space sets. It should be understood that one BWP may include a plurality of control resource sets, and one control resource set may include a plurality of search space sets. Similarly, the BWP2 is provided with C2 control resource sets and S2 search space sets, the BWP3 is provided with C3 control resource sets and S3 search space sets, and the BWP4 is provided with C4 control resource sets and S4 search space sets.

Example 1: The K BWPs are determined, for example, the BWP1 and the BWP2 are determined. In this case, all of the search space sets included in the BWP1 and all of the search space sets included in the BWP2 need to be performed detection on the downlink control channel; that is, the terminal needs to perform detection on the downlink control channel in the S1 search space sets and the S2 search space sets.

Example 2: The $$\sum_n Cn'$$

control resource sets are determined, for example, C1' control resource sets are determined in C1 control resource sets of the BWP1, and C3' control resource sets are determined in C3 control resource sets of the BWP3. In this case, downlink control channel detection has to be performed on all of the search spaces included in the C1' control resource sets and all of the search space sets included in the C3' control resource sets.

Example 3: The $$\sum_n Sn'$$

search space sets are determined, for example, S1' search space sets are determined in S1 search space sets of BWP1, and S4' search space sets are determined in S4 search space sets of BWP4. In this case, the terminal needs to perform detection on the downlink control channel in the S1' search space sets and the S4' search space sets.

In the above example, selecting part of the BWPs, part of the control resource sets, or part of the search space sets to perform detection on the downlink control channel may reduce the number of search space sets compared to performing detection on the downlink control channel in all of the search space sets. Not limited to this, embodiments of the present invention may also combine any two or three of the BWPs, the control resource sets, and the search space sets to select a final search space set, for example, selecting the BWP1 (that is, all of the search space sets included in the BWP1), C2' control resource set of the BWP2, S3' search space set of the BWP3.

In the technical solution of the embodiment of the present invention, the final search space set may be flexibly selected in different combinations in the BWPs, the control resource sets, and the search space sets.

In addition, the technical solution of the embodiment of the present invention further includes: the terminal determining resources scheduled by the downlink control channel of the K BWPs, wherein the resources scheduled by the downlink control channel include the resources of the K BWPs, and/or resources in other BWPs in the N BWPs other than the K BWPs.

Figure 4:
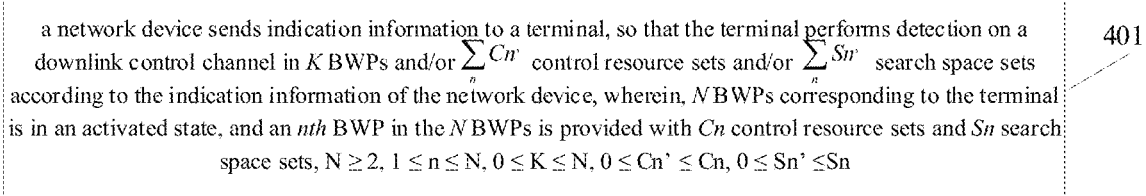
FIG. 4 is a schematic flowchart 2 of a channel detection method according to an embodiment of the present invention.

FIG. 4 is a schematic flowchart 2 of a channel detection method according to an embodiment of the present invention. As shown in FIG. 4, the channel detection method includes the following steps:

Step 401, a network device sends indication information to a terminal, so that the terminal performs detection on a downlink control channel in K BWPs and/or $$\sum_n Cn'$$

control resource sets and/or $$\sum_n Sn'$$

search space sets according to the indication information of the network device, wherein, N BWPs corresponding to the terminal is in an activated state, and an nth BWP in the N BWPs is provided with Cn control resource sets and Sn search space sets, N≥2, 1≤n≤N, 0≤K≤N, 0≤Cn'≤Cn, 0≤Sn'≤Sn.

In an embodiment, the network device transmits the downlink control channel in the K BWPs and/or the $$\sum_n Cn'$$

control resource sets and/or the $$\sum_n Sn'$$

search space sets according to a preset rule, wherein, the preset rule includes at least one of the following:

K BWPs with a largest or smallest subcarrier spacing in the N BWPs;

K BWPs with a largest or smallest bandwidth in the N BWPs;

K BWPs with a largest or smallest frequency domain range of the control resource sets in the N BWPs;

all of the control resource sets in the N BWPs include $$\sum_n Cn'$$

control resource sets with most or least frequency domain resources;

all of the control resource sets of the N BWPs include $$\sum_n Cn'$$

control resource sets with a largest or smallest time domain length;

all of the search space sets of the N BWPs include $$\sum_n Sn'$$

search space sets with a largest or smallest time domain density.

In an embodiment of the present invention, the indication information of the network device includes at least one of the following:

indication information of a BWP, indication information of a control resource set, and indication information of a search space set.

In this way, the terminal may perform detection on the downlink control channel in a BWP determined based on the indication information of the BWP; and/or, the terminal performs detection on the downlink control channel in a control resource set determined based on the indication information of the control resource set; and/or, the terminal performs detection on the downlink control channel in a search space set determined based on the indication information of the search space set.

In an embodiment of the present invention, the indication information of the network device is DCI, or RRC signaling, or System Information (SI).

In an embodiment of the present invention, resources scheduled by the downlink control channel include resources in the K BWPs, and/or resources in other BWPs in the NBWPs other than the K BWPs The technical solutions of the embodiments of the present invention will be further described below in conjunction with specific application examples.

Figure 5:
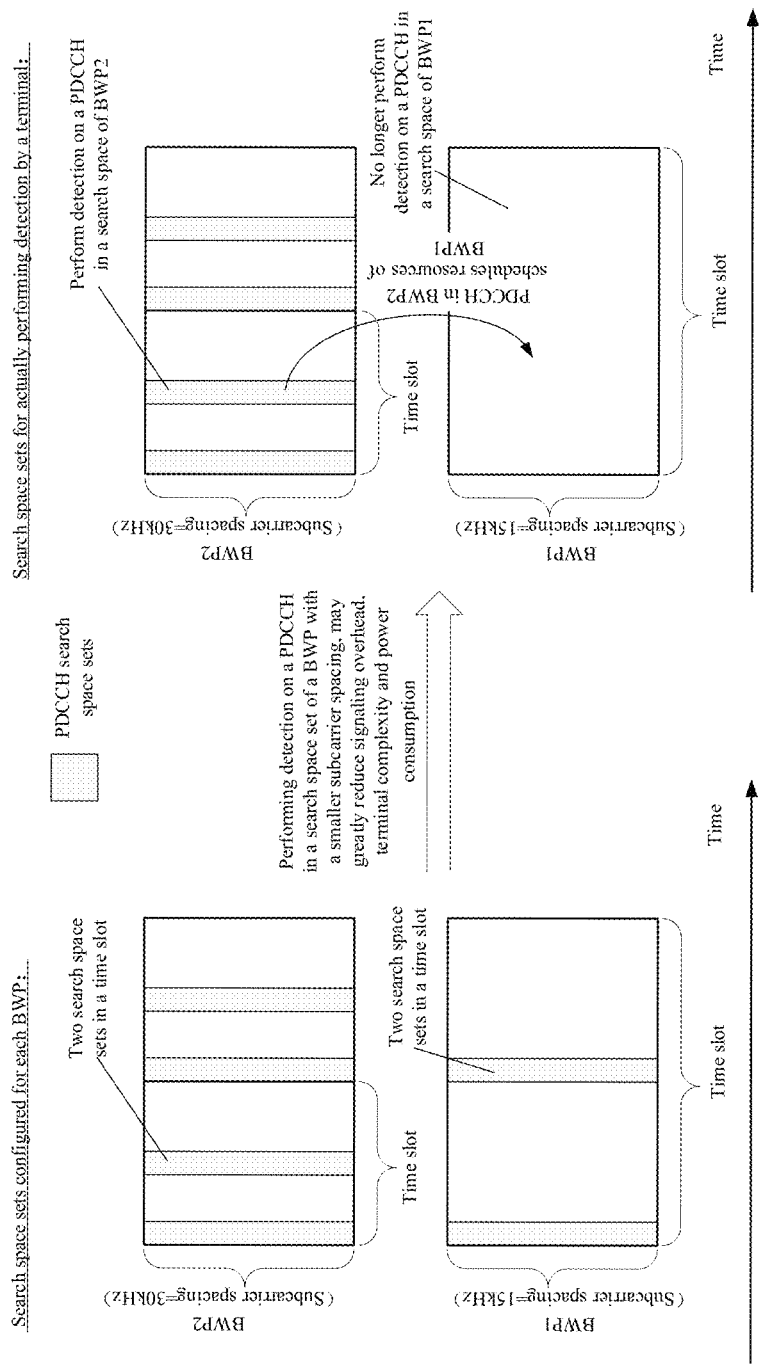
FIG. 5 is a schematic diagram of determining a BWP for performing detection on a PDCCH using a preset rule according to an embodiment of the present invention.

Example 1: Using a Preset Rule to Determine a BWP for Performing Detection on a PDCCH As shown in FIG. 5, a subcarrier spacing of the BWP1=15 kHz and a subcarrier spacing of the BWP2=30 kHz. In the BWP1 and BWP2, there are two search space sets in each time slot. Since the number of search space sets on the BWP2 is twice that of the BWP1 per unit time, a terminal only needs to perform detection on the PDCCH in the search space sets of the BWP2, and no longer perform detection on the PDCCH in the search space sets of the BWP1. The resources in the BWP1 are scheduled through the PDCCH in the BWP2.

In this way, the terminal does not need to perform detection on the PDCCH in the search space sets of two BWPs simultaneously, thereby greatly saving control signaling overhead, and reducing the complexity and power consumption for performing detection on the PDCCH by the terminal.

Figure 6:
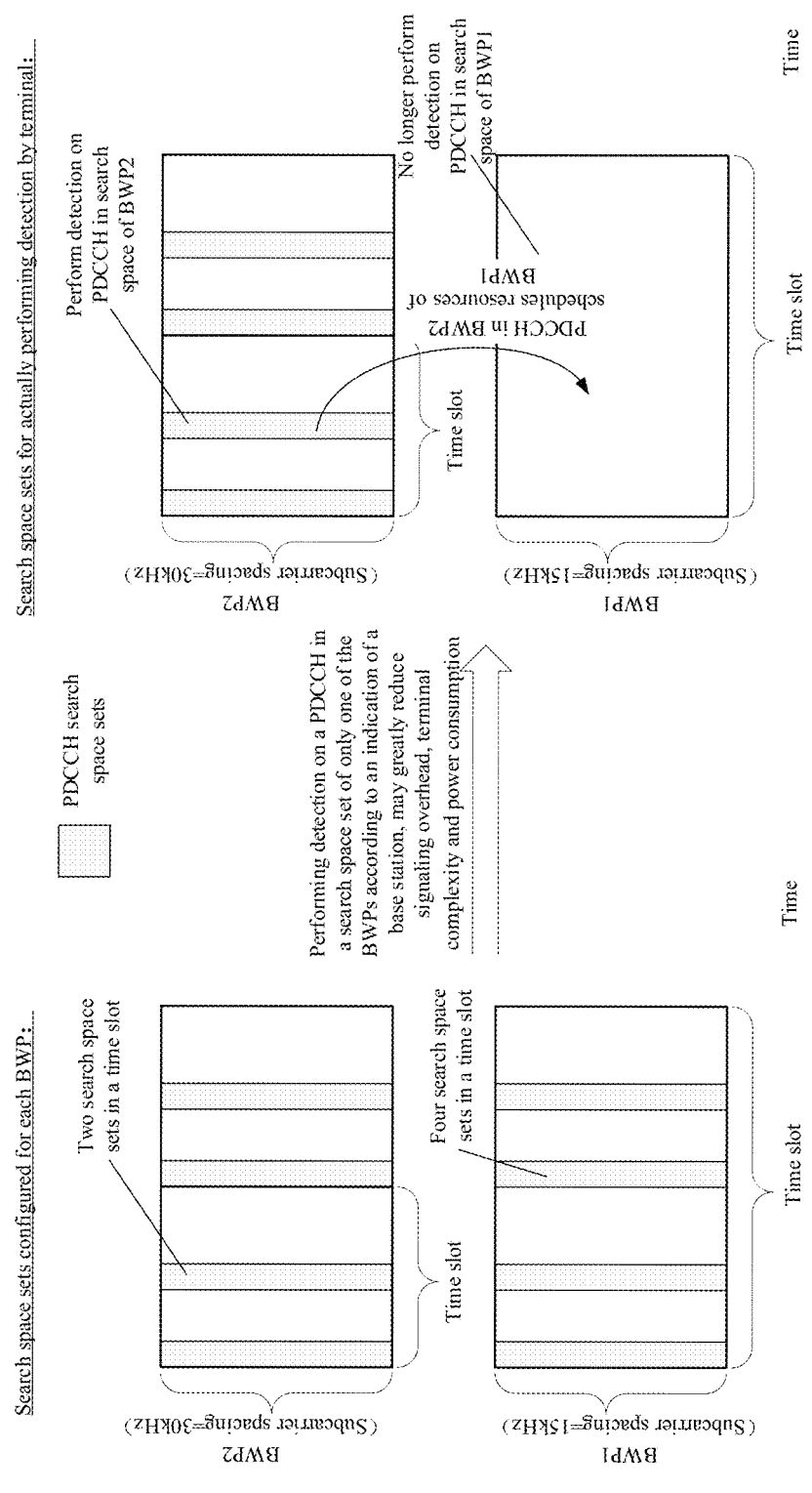
FIG. 6 is a schematic diagram of determining a BWP for performing detection on a PDCCH according to an explicit indication of a network device according to an embodiment of the invention.

Example 2: Determine a BWP for Performing Detection on a PDCCH According to an Explicit Indication of a Network Device As shown in FIG. 6, a subcarrier spacing of BWP1=15 kHz, and a subcarrier spacing of BWP2=30 kHz. In the BWP1, there are four search space sets in each time slot. In the BWP2, there are two search space sets in each time slot. Since the number of search space sets on the BWP2 is same as that on the BWP1 per unit time, a terminal only needs to perform detection on the PDCCH in the search space sets of the BWP2, and no longer perform detection on the PDCCH in the search space sets of the BWP1. The resources in the BWP1 are scheduled through the PDCCH in the BWP2.

In this way, the terminal does not need to perform detection on the PDCCH in the search space of two BWPs simultaneously, thereby greatly saving control signaling overhead, and reducing the complexity and power consumption for the terminal to perform detection on the PDCCH.

Figure 7:
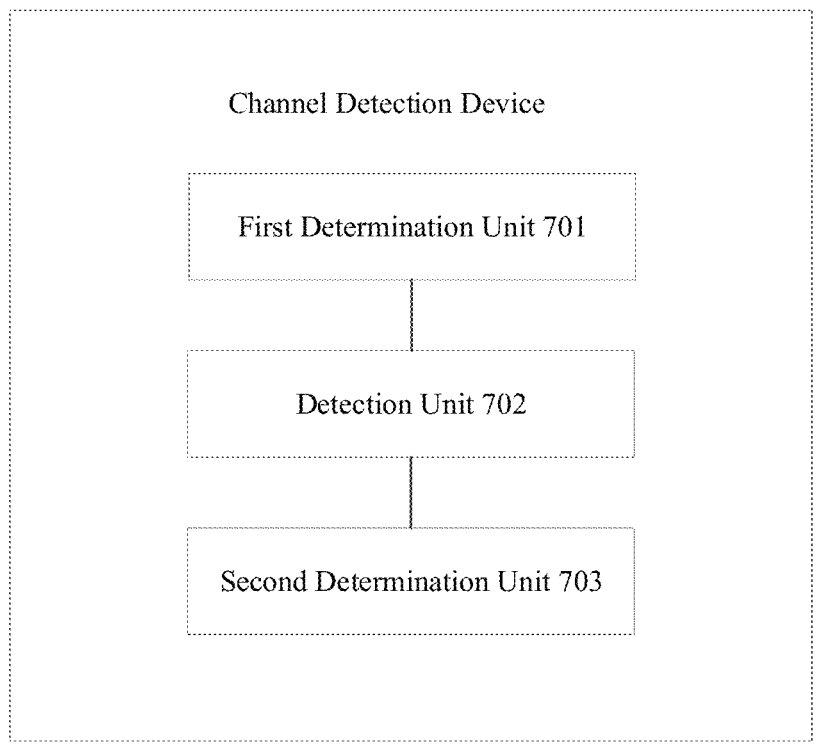
FIG. 7 is a schematic structural diagram 1 of a channel detection device according to an embodiment of the present invention.

FIG. 7 is a schematic structural diagram 1 of a channel detection device according to an embodiment of the present invention. As shown in FIG. 7, the channel detection device includes:

a first determination unit 701, configured to: when N downlink bandwidth parts (BWPs) corresponding to a terminal are in an activated state, wherein an nth BWP in the N BWPs is provided with Cn control resource sets and Sn search space sets, determine K BWPs and/or $$\sum_n Cn'$$

control resource sets and/or $$\sum_n Sn'$$

search space sets according to indication information or a preset rule of a network device, N≥2, 1≤n≤N, 0≤K≤N, 0≤Cn'≤Cn, 0≤Sn'≤Sn;

a detection unit 702, configured to: perform detection on a downlink control channel in the K BWPs and/or the $$\sum_n Cn'$$

control resource sets and/or the $$\sum_n Sn'$$

search space sets.

In an embodiment, the preset rule includes at least one of the following:

K BWPs with a largest or smallest subcarrier spacing in the N BWPs;

K BWPs with a largest or smallest bandwidth in the N BWPs;

K BWPs with a largest or smallest frequency domain range of the control resource sets in the N BWPs;

all of the control resource sets in the N BWPs include $$\sum_n Cn'$$

control resource sets with most or least frequency domain resources;

all of the control resource sets of the N BWPs include $$\sum_n Cn'$$

control resource sets with a largest or smallest time domain length;

all of the search space sets of the N BWPs include $$\sum_n Sn'$$

search space sets with a largest or smallest time domain density.

In an embodiment, the indication information of the network device includes at least one of the following:

indication information of a BWP, indication information of a control resource set, and indication information of a search space set.

In an embodiment, the detection unit 702 is configured to: perform detection on the downlink control channel in a BWP determined based on the indication information of the BWP; and/or, perform detection on the downlink control channel in a control resource set determined based on the indication information of the control resource set; and/or, the terminal perform detection on the downlink control channel in a search space set determined based on the indication information of the search space set.

In an embodiment, the indication information of the network device is DCI, or RRC signaling, or System Information (SI).

In an embodiment, the device further includes:

a second determination unit 703, configure to: determine resources scheduled by the downlink control channel in the K BWPs, wherein the resources scheduled by the downlink control channel include resources in the K BWPs, and/or resources in other BWPs in the N BWPs other than the K BWPs.

Those skilled in the art should understand that the implementation function of each unit in the channel detection device shown in FIG. 7 may be understood with reference to the related description of the foregoing channel detection method. The function of each unit in the channel detection device shown in FIG. 7 may be realized by a program running on a processor, or by a specific logic circuit.

Figure 8:
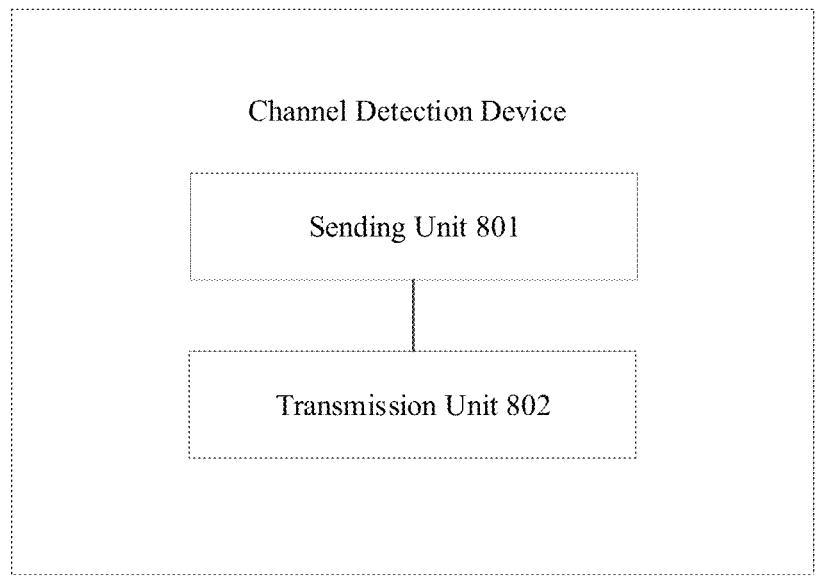
FIG. 8 is a schematic structural diagram 2 of a channel detection device according to an embodiment of the present invention.

FIG. 8 is a structural composition diagram 2 of a channel detection device according to an embodiment of the present invention. As shown in FIG. 8, the channel detection device includes:

a sending unit 801, configured to: send indication information to a terminal, so that the terminal performs detection on a downlink control channel in K BWPs and/or $$\sum_n Cn'$$

control resource sets and/or $$\sum_n Sn'$$

search space sets according to the indication information of the network device, wherein, N BWPs corresponding to the terminal is in an activated state, and an nth BWP in the N BWPs is provided with Cn control resource sets and Sn search space sets, N≥2, 1≤n≤N, 0≤K≤N, 0≤Cn'≤Cn, 0≤Sn'≤Sn.

In an embodiment, the device further includes:

a transmission unit 802, configured to: transmit the downlink control channel in the K BWPs and/or $$\sum_n Cn'$$

control resource sets and/or $$\sum_n Sn'$$

search space sets according to a preset rule.

In an embodiment, the preset rule includes at least one of the following:

K BWPs with a largest or smallest subcarrier spacing in the N BWPs;

K BWPs with a largest or smallest bandwidth in the N BWPs;

K BWPs with a largest or smallest frequency domain range of the control resource sets in the N BWPs;

all of the control resource sets in the N BWPs include $$\sum_n Cn'$$

control resource sets with most or least frequency domain resources;

all of the control resource sets of the N BWPs include $$\sum_n Cn'$$

control resource sets with a largest or smallest time domain length;

all of the search space sets of the N BWPs include $$\sum_n Sn'$$

search space sets with a largest or smallest time domain density.

In an embodiment, the indication information of the network device includes at least one of the following:

indication information of a BWP, indication information of a control resource set, and indication information of a search space set.

In an embodiment, the indication information of the network device is DCI, or RRC signaling, or System Information (SI).

In an embodiment, resources scheduled by the downlink control channel include resources in the K BWPs, and/or resources in other BWPs in the N BWPs other than the K BWPs.

Those skilled in the art should understand that the implementation function of each unit in the channel detection device shown in FIG. 8 may be understood by referring to the related description of the foregoing channel detection method. The function of each unit in the channel detection device shown in FIG. 8 may be realized by a program running on a processor, or by a specific logic circuit.

If the channel detection device in the embodiment of the present invention is implemented in the form of a software function module and sold or used as an independent product, it may also be stored in a computer-readable storage medium. Based on this understanding, the technical solutions of the embodiments of the present invention can be embodied in the form of software products in essence or part of contributions to the prior art. The computer software product is stored in a storage medium and includes several instructions for a computer device (which may be a personal computer, a server, or a network device, etc.) executes all or part of the methods described in the embodiments of the present invention. The foregoing storage media include various media that can store program codes, such as a U disk, a mobile hard disk, a Read Only Memory (ROM), a magnetic disk, or an optical disk. In this way, the embodiments of the present invention are not limited to any specific combination of hardware and software.

Correspondingly, an embodiment of the present invention also provides a computer storage medium in which computer-executable instructions are stored. When the computer-executable instructions are executed by a processor, the above-mentioned channel detection method of the embodiment of the present invention is implemented.

Figure 9:
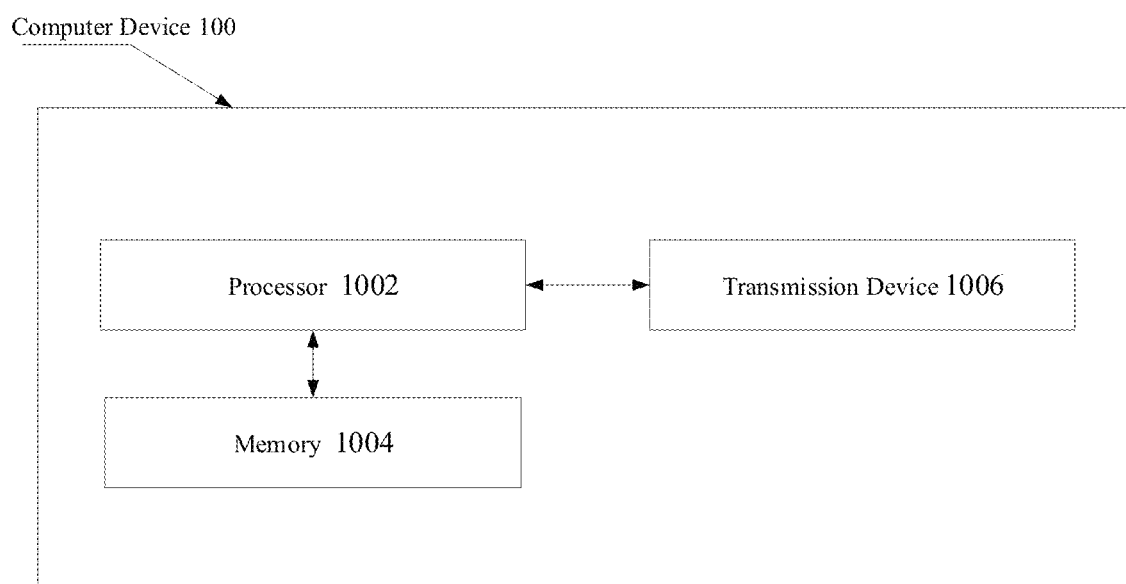
FIG. 9 is a schematic structural diagram of a computer device according to an embodiment of the present invention.

FIG. 9 is a schematic structural diagram of a computer device according to an embodiment of the present invention. The computer device may be a terminal or a network device. As shown in FIG. 9, the computer device 100 may include one or more (only one is shown in the figure) processor 1002 (the processor 1002 may include but is not limited to a Micro Controller Unit (MCU) or a processing device such as a Field Programmable Gate Array (FPGA)), a memory 1004 for storing data, and a transmission device 1006 for communication functions. A person of ordinary skill in the art may understand that the structure shown in FIG. 9 is merely an illustration, which does not limit the structure of the above electronic device. For example, the computer device 100 may also include more or fewer components than that shown in FIG. 9 or have a different configuration from that shown in FIG. 9.

The memory 1004 may be used to store software programs and modules of application software, such as program instructions/modules corresponding to the methods in the embodiments of the present invention. The processor 1002 executes various functional applications and data processing by running software programs and modules stored in the memory 1004, that is, implementing the above method. The memory 1004 may include a high-speed random access memory, and may also include a non-volatile memory, such as one or more magnetic storage devices, flash memory, or other non-volatile solid-state memory. In some examples, the memory 1004 may further include memories remotely provided with respect to the processor 1002, and these remote memories may be connected to the computer device 100 through a network. Examples of the above network include but are not limited to the Internet, intranet, local area network, mobile communication network, and combinations thereof.

The transmission device 1006 is used to receive or transmit data via a network. The specific example of the network described above may include a wireless network provided by a communication provider of the computer device 100. In one example, the transmission device 1006 includes a Network Interface Controller (NIC), which may be connected to other network devices through the base station to communicate with the Internet. In one example, the transmission device 1006 may be a Radio Frequency (RF) module, which is used to communicate with the Internet in a wireless manner.

The technical solutions described in the embodiments of the present invention can be arbitrarily combined without conflict.

In the technical solutions of the embodiments of the present invention, when N downlink bandwidth parts (BWPs) corresponding to a terminal are in an activated state, wherein an nth BWP in the N BWPs is provided with Cn control resource sets and Sn search space sets, the terminal determines K BWPs and/or $$\sum_n Cn'$$

control resource sets and/or $$\sum_n Sn'$$

search space sets according to indication information or a preset rule of a network device, N≥2, 1≤n≤N, 0≤K≤N, 0≤Cn'≤Cn, 0≤Sn'≤Sn; and the terminal performs detection on a downlink control channel in the K BWPs and/or the $$\sum_n Cn'$$

control resource sets and/or the $$\sum_n Sn'$$

search space sets. By using the technical solutions of the embodiments of the present invention, when a plurality of BWPs are activated simultaneously, a part of the BWPs and/or control resource sets and/or search space sets are selected to perform detection on a PDCCH, which may reduce PDCCH detection complexity, reduce signaling overhead, and improve system spectrum efficiency.

In the several embodiments provided by the present invention, it should be understood that the disclosed method and smart device may be implemented in other ways. The device embodiments described above are only schematic. For example, the division of the unit is only a division of logical functions. In actual implementation, there may be another division manner, for example, multiple units or components may be combined, or may be integrated into another system, or some features can be ignored, or not implemented. In addition, the coupling or direct coupling or communication connection between the displayed or discussed components may be through some interfaces, and the indirect coupling or communication connection of the device or unit may be electrical, mechanical, or other forms of.

The units described as separate components may or may not be physically separated, and the components displayed as units may or may not be physical units, that is, they may be located in one place or distributed to multiple network units; some or all of the units may be selected according to actual needs to achieve the purpose of the solution of this embodiment.

In addition, the functional units in the embodiments of the present invention may all be integrated into one second processing unit, or each unit may be separately used as a unit, or two or more units may be integrated into one unit; the above integrated unit can be implemented in the form of hardware, or in the form of hardware plus software functional units.

The above are only specific embodiments of the present invention, but the scope of protection of the present invention is not limited to this. Any person skilled in the art may easily think of changes or replacements within the technical scope disclosed by the present invention, and they should be covered by the protection scope of the present invention.

What is claimed is:

1. A channel detection method, comprising:
when N downlink bandwidth parts (BWPs) corresponding to a terminal are in an activated state, wherein an nth BWP in the NBWPs is provided with Cn control resource sets and Sn search space sets, determining, by the terminal, at least one of K BWPs or $$\sum_n Cn'$$

control resource sets or $$\sum_n Sn'$$

search space according to a preset rule of a network device, N≥2, 1≤n≤N, 1≤K≤N, 1≤Cn'≤Cn, 1≤Sn'≤Sn; and performing, by the terminal, detection on a downlink control channel in at least one of the K BWPs or the $$\sum_n Cn'$$

control resource sets or the $$\sum_n Sn'$$

search space sets
wherein, the preset rule comprises at least one of:
K BWPs with a largest or smallest subcarrier spacing in the N BWPs; and
all of the control resource sets in the NBWPs comprise $$\sum_n Cn'$$

control resource sets with most or least frequency domain resources.

2. The method according to claim 1, wherein, the method further comprises:
determining, by the terminal, resources scheduled by the downlink control channel in the K BWPs, wherein the resources scheduled by the downlink control channel comprise resources in at least one of the K BWPs, or resources in other BWPs in the NBWPs other than the K BWPs.

3. A channel detection method, comprising:
transmitting, by a network device, a downlink control channel in at least one of K BWPs or $$\sum_n Cn'$$

control resource sets or $$\sum_n Sn'$$

search space sets according to a preset rule, wherein, N BWPs corresponding to a terminal is in an activated state, and an nth BWP in the N BWPs is provided with Cn control resource sets and Sn search space sets, N≥2, 1≤n≤N, 1≤K≤N, 1≤Cn'≤Cn, 1≤Sn'≤Sn,
wherein, the preset rule comprises at least one of:
K BWPs with a largest or smallest subcarrier spacing in the N BWPs; and
all of the control resource sets in the NBWPs comprise $$\sum_n Cn'$$

control resource sets with most or least frequency domain resources.

4. The method according to claim 3, wherein, resources scheduled by the downlink control channel comprise resources in at least one of the K BWPs, or resources in other BWPs in the N BWPs other than the K BWPs.

5. A channel detection device, comprising a processor, a memory, and a transmission device for communication, wherein when the processor executes functional applications and data stored in the memory, the execution causes the channel detection device to:
when N downlink bandwidth parts (BWPs) corresponding to a terminal are in an activated state, wherein an nth BWP in the N BWPs is provided with Cn control resource sets and Sn search space sets, determine, by the processor, at least one of K BWPs or $$\sum_n Cn'$$

control resource sets or $$\sum_n Sn'$$

search space sets according to or a preset rule of a network device, N≥2, 1≤n≤N, 1≤K≤N, 1≤Cn'≤Cn, 1≤Sn'≤Sn; and
perform, by the processor, detection on a downlink control channel in at least one of the K BWPs or the $$\sum_n Cn'$$

control resource sets or the $$\sum_n Sn'$$

search space sets,
wherein, the preset rule comprises at least one of:
K BWPs with a largest or smallest subcarrier spacing in the NBWPs; and
all of the control resource sets in the N BWPs comprise $$\sum_n Cn'$$

control resource sets with most or least frequency domain resources.

6. The device according to claim 5, wherein, the processor is further configured to:
determine resources scheduled by the downlink control channel in the K BWPs, wherein the resources scheduled by the downlink control channel comprise resources in at least one of the K BWPs, or resources in other BWPs in the N BWPs other than the K BWPs.

7. A channel detection device, comprising a processor, a memory, and a transmission device for communication, wherein when the processor executes functional applications and data stored in the memory, the execution causes the channel detection device to implement steps of the method according to claim 3.

8. A non-transitory computer storage medium, on which computer-executable instructions are stored, and when the computer-executable instructions are executed by a processor, steps of the method according to claim 1 are implemented.

\* \* \* \* \*